(12) United States Patent
Liu et al.

(10) Patent No.: US 11,899,578 B2
(45) Date of Patent: Feb. 13, 2024

(54) SYSTEM AND METHOD FOR DYNAMIC SELECTION OF A GARBAGE COLLECTOR FOR JAVA-BASED MICROSERVICES

(71) Applicant: Dell Products L.P., Round Rock, TX (US)

(72) Inventors: Min Liu, Shanghai (CN); Gururaj Kulkarni, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 65 days.

(21) Appl. No.: 17/834,954

(22) Filed: Jun. 8, 2022

(65) Prior Publication Data

US 2023/0342295 A1 Oct. 26, 2023

Related U.S. Application Data

(63) Continuation-in-part of application No. 17/725,224, filed on Apr. 20, 2022, now Pat. No. 11,704,242.

(51) Int. Cl.
| | | |
|---|---|---|
| G06F 12/02 | (2006.01) | |
| G06F 12/06 | (2006.01) | |
| G06F 9/455 | (2018.01) | |
| G06F 9/445 | (2018.01) | |

(52) U.S. Cl.
CPC ...... *G06F 12/0253* (2013.01); *G06F 12/0646* (2013.01); *G06F 9/44505* (2013.01); *G06F 9/45504* (2013.01)

(58) Field of Classification Search
CPC ............. G06F 12/0253; G06F 12/0646; G06F 9/45504; G06F 9/45505
See application file for complete search history.

(56) References Cited

U.S. PATENT DOCUMENTS

| | | | |
|---|---|---|---|
| 8,195,721 B2 * | 6/2012 | Lindholm | G06F 12/0269 711/170 |
| 8,892,610 B1 * | 11/2014 | Pang | G06F 12/0253 707/819 |
| 10,579,407 B2 | 3/2020 | Ahuja | |
| 10,860,499 B2 | 12/2020 | Zhang | |
| 2005/0278496 A1 | 12/2005 | Redestig | |
| 2012/0191937 A1 | 7/2012 | Feldman | |
| 2019/0065367 A1 * | 2/2019 | Li | G06F 12/0246 |
| 2021/0064523 A1 * | 3/2021 | Kale | G06F 12/0246 |

* cited by examiner

*Primary Examiner* — Terrell S Johnson
(74) *Attorney, Agent, or Firm* — Staniford Tomita LLP

(57) ABSTRACT

A log generated over a time period of garbage collection cycles of a microservice is reviewed. The log includes garbage collection events and pause times for each event. A determination is made that a threshold number of consecutive garbage collection events has been reached where each consecutive event had a pause time exceeding a threshold pause time. Upon the determination, a change is made to a configuration file associated with the microservice to reduce the pause times for a next time period. Once the microservice enters an idle state, a command is generated to restart the microservice for the change in the configuration file to take effect.

18 Claims, 10 Drawing Sheets

-XX:MinHeapFreeRatio=20 -XX:MaxHeapFreeRatio=40 -Xms256m -Xmx1024m

FIG. 4

| Region | Max Committed (MB) | Max Used (MB) |
|---|---|---|
| Heap | 1024 | 900 |
| Survivor | 10 | 10 |
| Eden | 180 | 170 |
| Old Gen | 800 | 650 |
| Meta space | 250 | 245 |
| Code Cache | 100 | 80 |
| GC | 160 | 160 |
| Threads | 200 | 200 |
| ... | | |

FIG. 5

-XX:MinHeapFreeRatio=10 -XX:MaxHeapFreeRatio=20 -Xms990m -Xmx1260m -XX:MetaspaceSize=250m -XX:MaxMetaspaceSize=350m -XX:InitialCodeCacheSize=80m -XX:ReservedCodeCacheSize=120m -XX:NewSize=500m -XX:MaxNewSize=700m -XX:SurvivorRatio=6

FIG. 6

| Time | Service | RSS (MB) | Swap (MB) | MinHeap Setting | MaxHeap Setting | Current heap | Survivor | Eden | OldGen | Meta | CodeCache | GC | Threads |
|---|---|---|---|---|---|---|---|---|---|---|---|---|---|
| T1 | A | 400 | 200 | 128 | 1024 | 256 | 10 | 180 | 600 | 170 | 90 | 120 | 25 |
| T2 | B | 500 | 159 | 256 | 768 | 399 | 10 | 170 | 500 | 175 | 80 | 110 | 15 |
| T3 | C | 200 | 180 | 256 | 768 | 380 | 10 | 180 | 450 | 180 | 70 | 100 | 20 |
| T4 | D | 600 | 200 | 256 | 1024 | 450 | 10 | 180 | 750 | 190 | 90 | 125 | 25 |
| ... | | | | | | | | | | | | | |

FIG. 7

SYSTEM AND METHOD FOR DYNAMIC SELECTION OF A GARBAGE COLLECTOR FOR JAVA-BASED MICROSERVICES

CROSS-REFERENCE TO RELATED APPLICATIONS

The present application is a continuation-in-part of U.S. patent application Ser. No. 17/725,224, filed Apr. 20, 2022, which is assigned to the assignee of the present application, and incorporated herein by reference in its entirety.

TECHNICAL FIELD

The present invention relates generally to information processing systems, and more particularly to selecting garbage collectors for microservices in a process virtual machine environment.

BACKGROUND

An application designed with a distributed microservices architecture includes multiple microservices. Each microservice is designed to process a particular function or perform a small set of specific operations. When the application is required to process a request, a part of the request may be processed by a microservice while another part of the request is processed by another microservice. Advantages of the microservice architecture over traditional monolithic application architectures include improved scalability, independent deployments, reduced downtime through fault isolation, and smaller codebases that are more easily managed.

These microservices are provided with statically designated memory settings for heap memory, heap related memory, garbage collection (GC), and others. In a production environment, however, the memory requirements for these microservices may shrink and expand. At certain times, the service may require more memory, while at other times the memory requirement will shrink. Further, each customer of the application may have their own unique needs and requirements. A memory setting that is appropriate for one customer may not be appropriate for another customer.

Static memory settings can lead to inefficient usage of memory. Garbage collection (GC) refers to a set of operations where memory may be reclaimed. GC may be run when, for example, a particular memory region becomes full. Inefficient memory settings, however, can result in service crashes due to resource crunches, task processing failures, frequent garbage collection cycles, or long garbage collection cycle times—all of which can negatively impact the overall performance of the application.

In addition to memory playing a critical role, garbage collection can also impact performance of the microservice. Garbage collection includes collecting of dead objects from Java service allocated memory to free-up and reclaim the memory. The Java service memory is managed in generations. The generations are memory pools holding objects of different ages. Garbage collection occurs in each generation when the generation fills up. The vast majority of objects are allocated in a pool dedicated to young objects (the young generation), and most objects die there. When the young generation fills up, it causes a minor garbage collection in which only the young generation is collected; garbage in other generations is not reclaimed. Similarly, there is old generation where objects not garbage collected are moved to old generation and once that memory space starts filling up then dead objects in old generation are collected to reclaim space.

There are many different types of garbage collectors or garbage collection algorithms. Each type of garbage collector or algorithm offers certain advantages and disadvantages depending on factors such as the design of the microservice, computer environment, and other factors. Furthermore, a garbage collector selected at a time of an initial release of the microservice may not necessarily be the most efficient garbage collector later on when additional enhancements to the service have been made.

There is a need for improved systems and techniques for dynamically selecting garbage collectors for microservices.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 4 shows an example of an initial set of memory parameters, according to one or more embodiments.

FIG. 5 shows an example of memory data that may be collected for different memory regions, according to one or more embodiments.

FIG. 6 shows an example of parameters associated with memory that may be tuned, according to one or more embodiments.

FIG. 7 shows a data format for storing memory utilization data, according to one or more embodiments.

DETAILED DESCRIPTION

Figure 1:
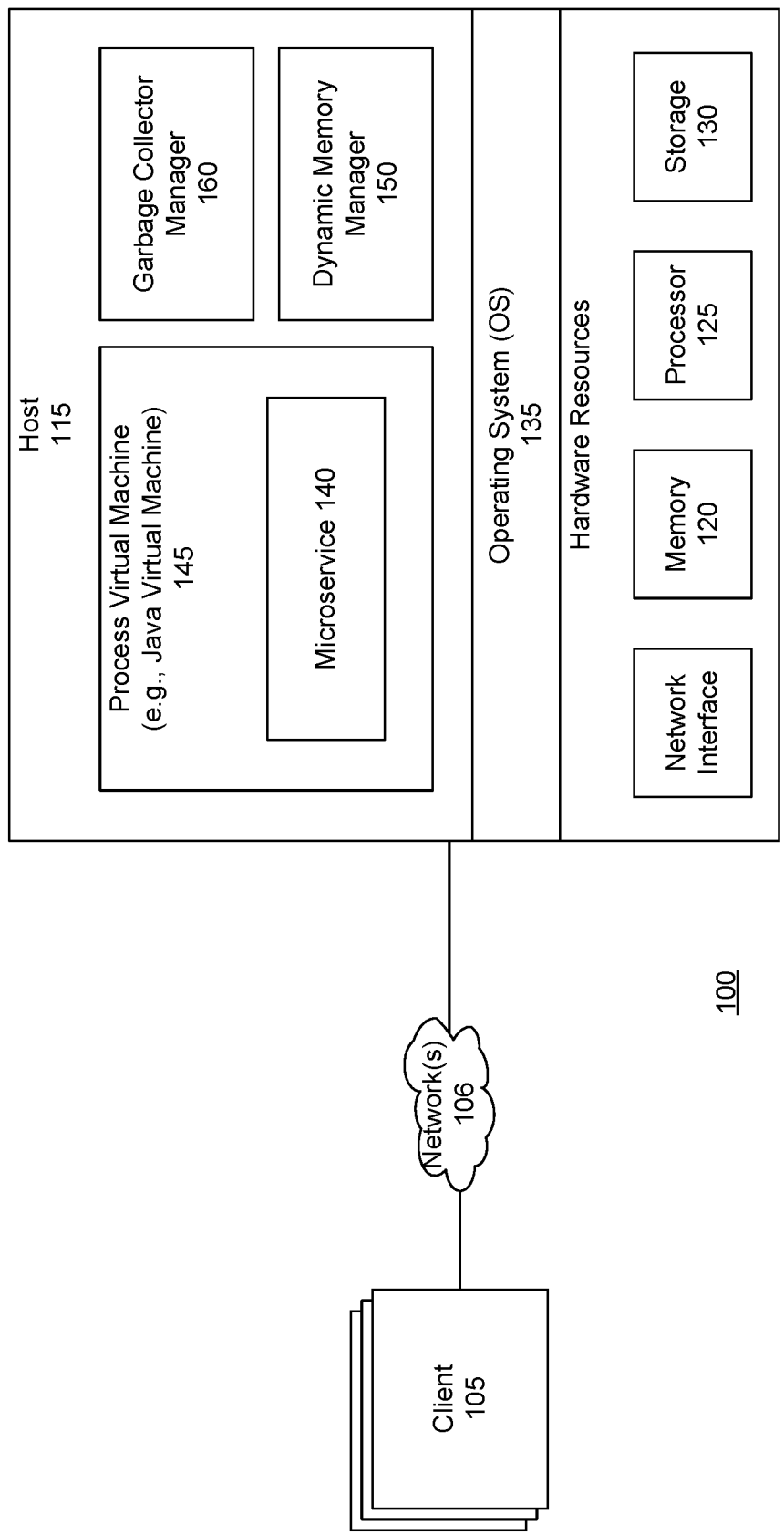
FIG. 1 shows a block diagram of an information processing system for dynamically managing memory for microservices, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

FIG. 1 shows a block diagram of an information processing system 100 within which methods and systems for dynamically and automatically managing memory for microservices executed by a process virtual machine may be implemented. In the example shown in FIG. 1, clients 105 are connected via a network 106 to one or more hosts devices 115. A host includes hardware resources such as memory 120, processor 125, storage 130, and other hardware components. These components may be interconnected by a bus or other connection scheme. The host includes an operating system (OS) 135 that manages the underlying hardware.

In an embodiment, a host forms part of a distributed microservices based architecture. In this embodiment, the host (or a cluster of hosts) hosts a distributed application designed as a set of microservices. An example of such an application includes PowerProtect Data Manager (PPDM) as provided by Dell Technologies of Round Rock, Texas. PowerProtect Data Manager is a data protection application providing backup, restore, automated discovery, deduplication, and IT governance for physical, virtual, and cloud environments. While some specific embodiments are described in conjunction with PPDM, it should be appreciated that the described systems and techniques can be applied to other applications designed using a microservices based architecture such as a customer relationship management (CRM) application, ecommerce application, on-demand video streaming application, and many others.

A distributed microservices architecture refers to an architectural style for developing applications. Microservices allow a large application to be separated into smaller independent parts. Each part is responsible for a particular function in servicing an overall request to the application. For example, in a microservices based data protection application, there can be a microservice responsible for deletion of expired backup copies, there can be another different microservice responsible for authentication, there can be another different microservice responsible for data copying, there can be another different microservice responsible for deduplication, and so forth. Microservices can communicate and coordinate using application programming interfaces (APIs) exposed by each microservice. A distributed microservices architecture offers an easier and less costly way to manage and upgrade an application over time as compared to traditional monolithic application architectures because enterprises can develop, deploy, and scale each microservice independently.

As shown in the example of FIG. 1, the host hosts one or more microservices 140. In an embodiment, a microservice is executed by a process virtual machine 145. A dynamic memory manager 150 on the host is responsible for monitoring memory allocated by the process virtual machine to the microservices and collecting memory utilization by the microservices. The dynamic memory manager reviews collected memory utilization or metrics to identify memory that is over-utilized or under-utilized and then makes adjustments to the memory settings of a microservice accordingly.

A process virtual machine may be referred to as an application virtual machine, language virtual machine, or managed runtime environment. A process virtual machine allows the running of a single process as an application on a host machine. That is, a process virtual machine is designed to run a single program, i.e., support a single process. The program running inside is limited to the resources and abstractions provided by the virtual machine. A process virtual machine runs as an application inside an operating system and supports a single process. It is created when that process is started and destroyed when it exits. A process virtual machine provides a platform-independent programming environment that abstracts away details of the underlying hardware or operating system, and allows a program to execute in the same way on any platform.

An example of a process virtual machine is the Java virtual machine (JVM). The Java virtual machine allows a system to run Java applications as if they were native to the system. Each Java microservice instance is a Java process that utilizes the Java virtual machine. In other words, each microservice is an individual process in a container and includes a Java virtual machine. The container is a portable runtime environment which runs on the host. A process virtual machine provides a high-level abstraction in that it executes code written in a high-level programming language such as Java. This is may be contrasted by the low-level instruction set architecture (ISA) abstraction of a system virtual machine. That is, a process virtual machine is different from a system virtual machine. A system virtual machine refers to a fully virtualized virtual machine designed to be a substitute for a physical machine. This type of virtual machine runs on a host machine by utilizing a hypervisor such as VMware ESXi to access the underlying physical host machine's resources. In other words, a system virtual machine provides a complete system platform which supports the execution of a complete operating system (OS).

Distributed microservices based architectures continue to grow as an architecture of choice for building complex application stacks. A microservices architecture is becoming a de-facto choice for applications because of their ability to reduce multiple levels of dependencies in Agile methodologies, reduce the DevOps cycle, and provide improvements with go-to market strategies. Microservices may run on a single host or machine or on highly available clustered machines or containers. These microservices can also interact with other software services running on the same machine or a different machine such as "agents running on different host." Each service instance performs a unique set of tasks which is independent of other services and communicates with other microservices using either a REpresentational State Transfer (REST) API or message bus architecture. Therefore, resource requirements for such an application made of individual microservices varies from one service to another.

For today's modern world applications built with a microservice architecture it would be desirable to be able to dynamically adjust the resource requirements as one cannot always predict the demand. For example, the system may experience the spiking of resource demands at certain unusual intervals, which may not occur very frequently. If, however, they occur, then any failure impact may be high and cascade across the entire system.

Figure 2:
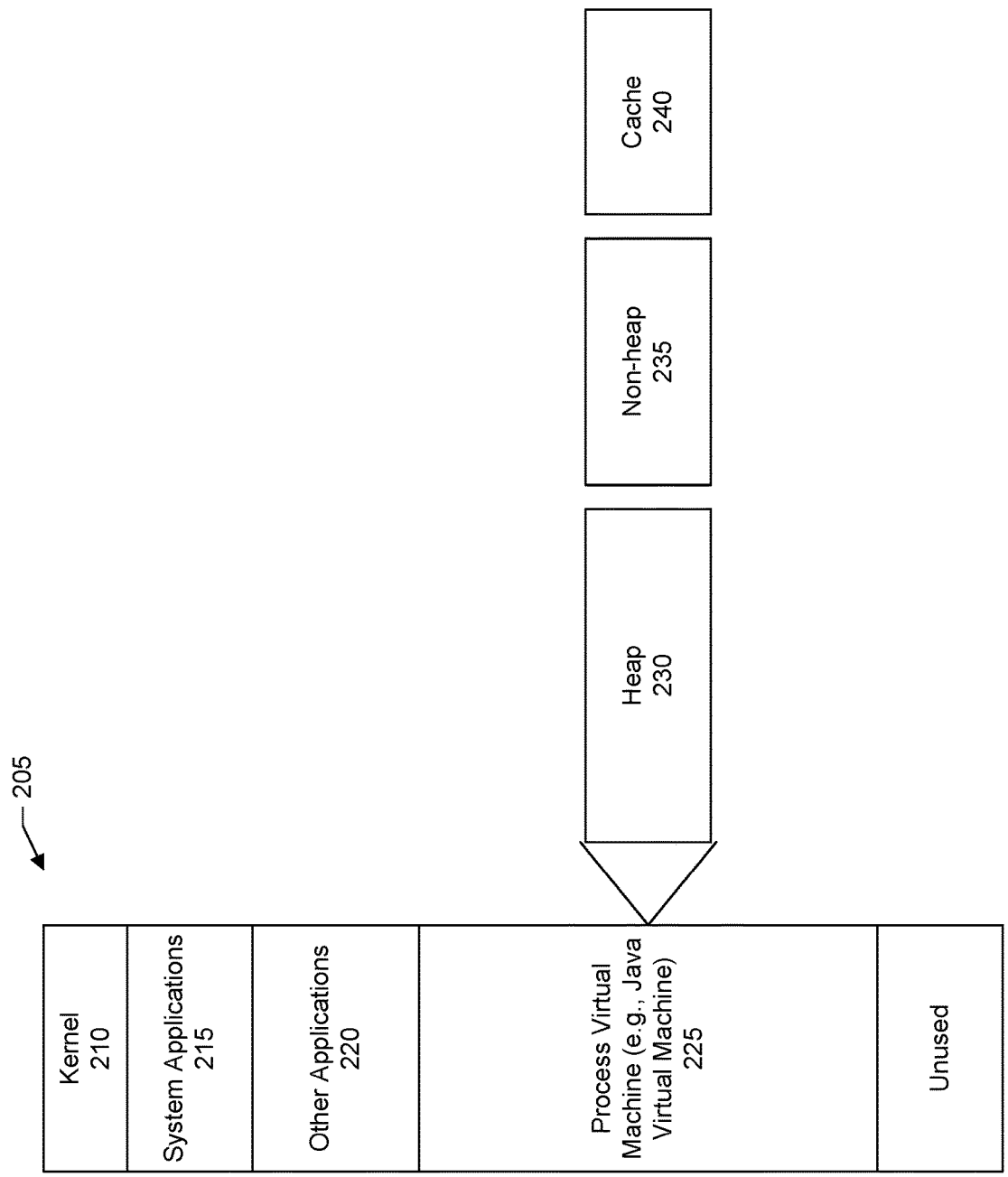
FIG. 2 shows a layout of host operating system memory, according to one or more embodiments.

FIG. 2 shows a layout of host OS memory 205. A portion of the memory is dedicated to a kernel 210 and system applications 215. The kernel is the part of the operating system code that remains resident in memory and facilitates interactions between hardware and software components. System applications refer to programs designed to manage the resources of the system such as memory, process management, security, and the like. Portions of available memory may be consumed by other applications and programs (e.g., user applications) 220 and a process virtual machine (e.g., Java virtual machine) 225.

In an embodiment, memory of the process virtual machine is further separated into other memory spaces including heap 230, non-heap 235, and cache 240 in order to store runtime data and compiled code. Each memory space may be further divided internally into other parts or regions.

For example, heap memory may be divided into young generation and old generation. Young generation is reserved for newly-allocated objects and includes Eden memory and survivor memory spaces. When memory allocated to the young generation fills up, a minor garbage collection occurs. JVM pauses application threads until the operation completes. Old generation is reserved for long-lived objects that may survive multiple rounds of minor garbage collection. Non-heap memory includes metaspace storing per-class structures such as runtime constant pool, field and method data, and the code for methods and constructors. Cache memory includes code cache storing compiled code.

In an embodiment, JVM memory parameters for the different regions are set in a configuration file. The configuration file may be referred to as an Abstract Markup Language (AML) file or configuration script. Each microservice is associated with a respective configuration file. For example, a first microservice may be associated with a first configuration file. A second microservice may be associated with a second configuration file, different from the first configuration file. A particular configuration file for a particular microservice specifies memory settings for each of the different memory regions. The particular configuration file for the particular microservice is reviewed and memory is set by the JVM for each of the different memory regions according to the memory parameters that have been set in the particular configuration file for the particular microservice.

The statically sized resource requirements for microservices may pose a significant risk of failure for data protection and other use cases that dynamically scale. For example, one cannot predict all the time, how resource demands such as "number of assets getting increased, surge in copies to be deleted, number of replication jobs increased, etc." will change. Since each microservice performs a unique set of sub-operations for different use cases, there can be an increase in memory requirements for one microservice and regular requirements on another microservice. In other words, during execution of a microservices based application, memory resource demands made by each of the different microservices can fluctuate greatly.

More particularly, an initial or minimum and maximum heap size may be set for each service. A maximum heap size would provide some space for peak use cases, but may not necessarily be suitable for all customers. Depending on the load, microservice heap memory may grow beyond the allocated maximum heap settings. This would lead to faster or more frequent garbage collection cycles and pausing of application activity. Setting too high of a heap size may result in less frequent garbage collection cycles, but each cycle may require an undesirably long time to complete.

Another problem with static memory settings concerns ongoing development of the application. As more and more functions are added to services or functions deprecated, a development team may not carefully measure and maintain good memory settings such as appropriate minimum and maximum heap sizing. For example, a microservice might have been designed with 1024 MB of heap memory when it was on-boarded. As new functions continue to be added, the heap memory for the microservice may be reduced without proper consideration.

In addition to the memory parameters of minimum and maximum heap size, there are other key parameters, such as minimum and maximum free heap ratio, young and old generation ratio/size, and others which are generally statically allocated for each individual microservice. These settings are critical factors affecting garbage collection activity.

For example, setting all the microservices of an application to have the same heap ratio settings may not adequately address each specific customer's individual use case. Depending on a particular customer's use case, these settings may slow the garbage collection activity. Or it may lead to underutilization of memory resources which might not be needed during idle state.

The memory needs of a particular microservice can fluctuate. Memory is a finite resource. Improper or inefficient memory settings can trigger frequent garbage collection to reclaim memory space; or not trigger garbage collection frequently enough. The former can impact overall performance as processing cycles are diverted from handling production requests to handling garbage collection operations. The latter can require longer garbage collection times and thus longer pause times. Thus, it is desirable to carefully adjust initial and maximum heap sizes (along with other memory parameters) to achieve efficient overall performance of the microservice.

There is a need to predict memory requirements for a microservice based on historical trends and to dynamically change and apply settings and restart services to handle peak situations while also reducing the overall impact to the system when restarting.

It is difficult to develop a one-size-fits all type of recommendation for an application that has many microservices and is to be used by many different customers. There is a need for a mechanism to monitor the memory usage and, depending on the use cases, dynamically change the memory settings based on historical usage. For example, during busy times, a microservice may spawn more or additional threads, create more objects and use more heap memory and during idle time, it may do less. So, most of the memory can be wasted if the memory allocation is not properly evaluated and periodically adjusted.

Figure 3:
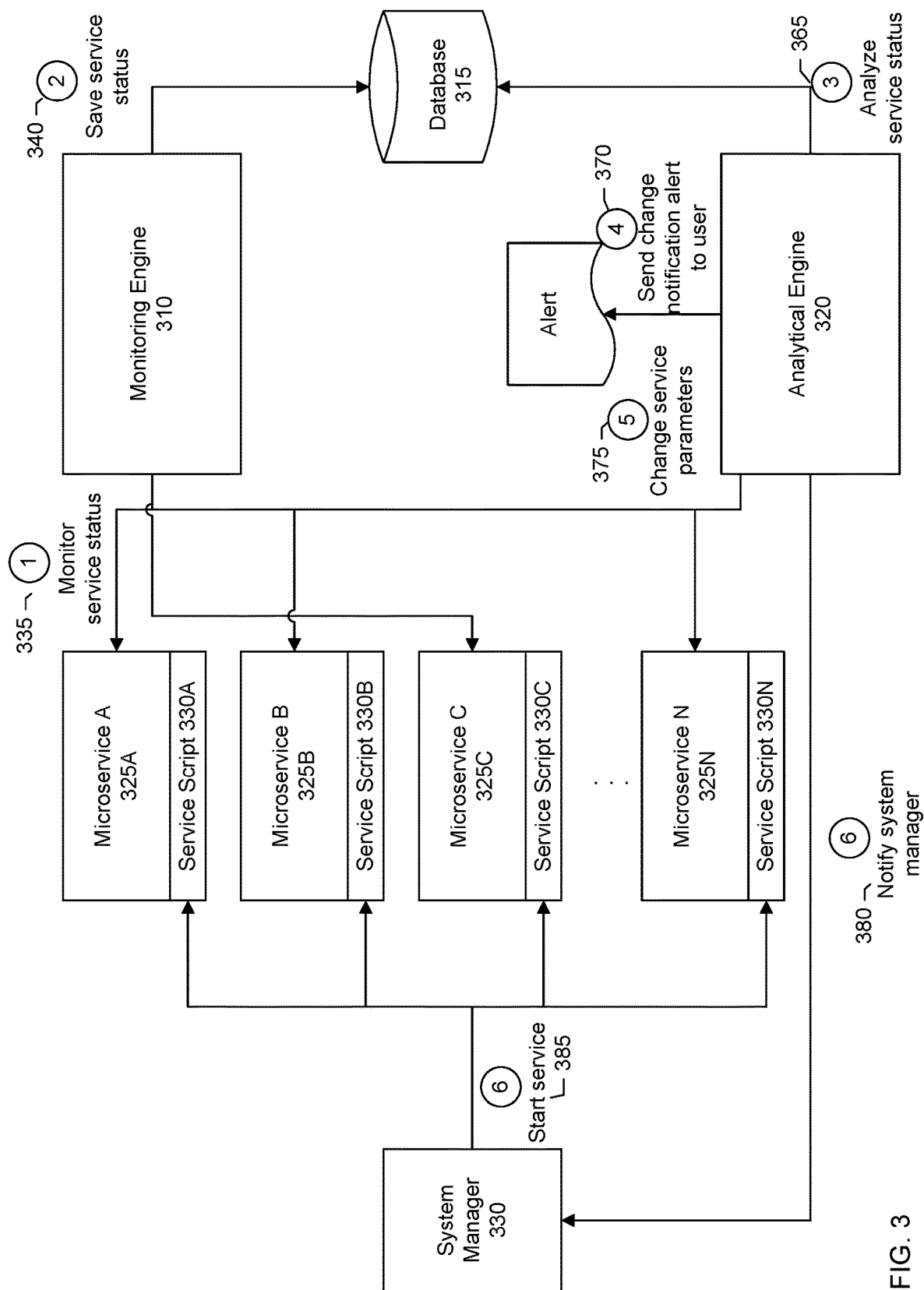
FIG. 3 shows a block diagram of components and interactions among the components for dynamically managing memory for microservices, according to one or more embodiments.

FIG. 3 shows a block diagram illustrating some components of the dynamic memory manager and interactions among different components of a microservices based application. In the example shown in FIG. 3, a dynamic memory manager includes a monitoring engine 310, database 315, and analytical engine 320. There are a set of microservices 325A-N having associated service scripts 330A-N, and a system manager 330 of the microservices application that manages the microservices.

In an embodiment, the monitoring engine monitors the memory utilization of each microservice at regular intervals. Specifically, memory utilization includes resident memory utilization, heap usage, heap settings, young and old generation ratio/size and heap used ratio over time. Based on the historical memory utilization trend, memory utilization hotspots are identified and the heap settings are dynamically adjusted for a particular microservice.

An idle time interval for the microservice is identified during which the heap settings are applied by restarting the microservice and thus minimizing the impact to the application.

A notification alert is generated to notify an end user (e.g., backup administrator or other IT administrator) about the heap settings being updated for a specific microservice or specific set of microservices. The alerts/warning messages for these settings are logged, e.g., heap being used exceeding the 90 percent of threshold value at different intervals. Systems and techniques are provided to adjust the garbage collection application pause time if exceeding beyond, for example, 5 seconds and dynamically adjusting more heap by appropriately logging the alerts.

In an embodiment, the monitoring engine and analytical engine components are included with a microservices based application (or existing components enhanced with monitoring and analytical functions) to dynamically manage or optimize the memory settings based on historical usage for individual microservices.

The monitoring engine captures the memory utilization of different memory regions at regular intervals for an individual microservice. Table A below shows some examples of memory utilization metrics that may be collected.

TABLE A

| Total memory usage | Resident Set Size (RSS, physical memory) and swap usage |
|---|---|
| Heap usage | max, committed, and used |
| Survivor | |
| Eden | |
| Tenured Space (Old Gen) | |
| Non-Heap usage | max, committed, and used |
| Metaspace: metadata and compressed class space | |
| Code Cache | |
| Garbage Collection | |
| Threads (Stack) | |
| Symbol | |
| Internal | |
| Others | |
| Garbage Collection Activities | |
| Minor GC | |
| Full GC | |

The monitoring engine periodically dumps the memory utilization into a persistent database or other persistent data storage structure. In an embodiment, elastic search is used to dump this data by creating a new index.

The analytical engine dynamically predicts the memory requirement for an individual microservice and decides the time interval for which memory would be optimally adjusted for the individual microservice. This may be accomplished by identifying the memory hotspots during operations. For example, if a scheduled protection runs or copy deletion operation runs, then heap utilization is checked against a certain threshold value (soft and hard threshold) and then compared against the idle state. It also monitors the garbage collection time for old and young generation objects. If garbage collection time is being spent for young generation then it adjusts the minimum heap ratio. If garbage collection time is being spent for old generation objects then it adjusts the maximum heap ratio dynamically. The analytical engine collects this information over specific period of time and makes the decision to optimize the heap settings for minimum and maximum usage for an individual microservice.

Referring now to FIG. 3, in a first step 335, the monitoring engine collects data based on available information such as garbage collection log, Java Management Extensions (JMX) information, process information, and the like. JMX provides a specification for monitoring and managing Java applications. Java applications can use JMX to expose runtime metrics. In a second step 340, the monitoring engine saves the collected information to the database. In a third step 365, the analytical engine analyzes the information in the database.

In a fourth step 370, the analytic engine send notifications to the user for the changes to be made to the memory settings of a microservice. In a fifth step 375, the analytic engine makes the parameter changes to a respective service script (e.g., configuration script or configuration file). In a sixth step 380, the analytic engine notifies the system manager of the changes. This step may be optional and may not be included in some embodiments. In a seventh step 385, the system manager restarts the service properly.

In an embodiment, a tuning methodology for memory settings of the microservices may be as follows. Based on the system's longest active protection policy, a determination may be made as to the monitoring and analytic cycle. For example, the cycle may be daily, weekly, or monthly. In many cases, a weekly cycle is used.

Based on the collected information, the analytic engine discovers each memory region's maximum used size of each service, and sets the initial memory size to the maximum used size and plus 10 percent additional, and max memory size has a 30 percent additional size, and sets the minimum free ratio to 10 percent and maximum free ratio to 20 percent.

After tuning is applied, garbage collection activities are examined including full garbage collection which has significant performance impacts to the service/system. If, for example, there still remains frequently full garbage collection it may indicate that the service is not operating properly. In this case, a telemetry alert may be sent out for a potential bug.

FIGS. 4-7 show an example of a tuning sequence for a single service. FIG. 4 shows a set of initial parameters. FIG. 5 shows an example of memory data that may be collected for different memory regions. As shown in the example of FIG. 5, monitored memory regions may include heap, survivor, eden, old generation, metaspace, code cache, garbage collection, threads, and others. Collected data may include, for each memory region, maximum committed sizes and maximum used sizes. FIG. 6 shows an example of parameters that may be tuned or adjusted.

FIG. 7 shows a data format within which the monitoring engine may store memory utilization data. As shown in the example of FIG. 7, a first column of the table identifies a time at which memory utilization was sampled. A second column of the table lists the microservices being monitored. The remaining columns of the table identify the specific memory regions sampled.

In an embodiment, the analytical engine periodically looks into the collected monitoring data for all the services to calculate the memory requirement settings for given service. In an embodiment, the analytical engine uses simple regression analysis to calculate the memory optimization for different JVM settings.

As an example, consider that the analytical engine needs to decide the maximum heap settings for a specific service. In an embodiment, the analytical engine looks into the memory resource utilization data for that service and calculates the average value. If there are any outliers, the analytical engine may decide to remove the outliers depending on the number of outliers. Below are formulas for calculating averages.

$$\text{max\_heap\_settings} = \text{Func}\ \{\text{Avg}\ \{GC \text{ time spent for } old \text{ generation}\}\}$$

$$\text{min\_heap\_settings} = \text{Func}\ \{\text{Avg}\ \{GC \text{ time spent for } young \text{ generation}\}\}$$

In an embodiment, the analytical engine checks the existing settings against current calculated settings and decides whether new settings need to be applied based on threshold values. If the calculated value is greater than a soft threshold value and greater than existing settings and less than a hard threshold value, then the analytical engine makes the appropriate changes to the service script (e.g., configuration script or configuration file). The analytical engine then informs the system manager service to decide on a time for a restart of the service depending on the idle time.

Figure 8:
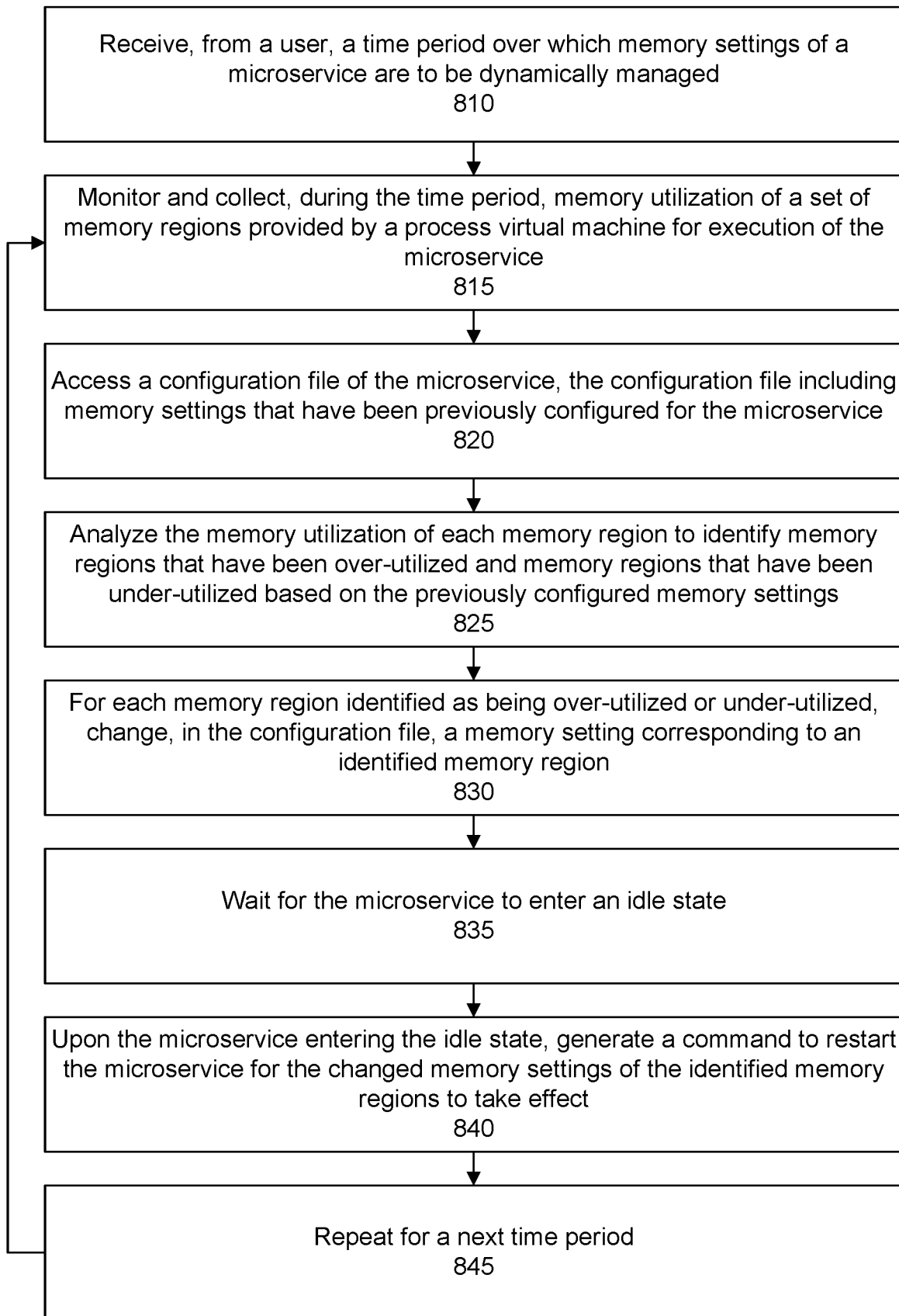
FIG. 8 shows a flow for dynamic management of memory for microservices, according to one or more embodiments.

FIG. 8 shows an overall flow for dynamically managing memory allocations of memory regions used by a microservices based application. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 810, a time period is received from a user over which memory settings of a microservice are to be dynamically managed, improved, or optimized. In an embodiment, the time period defines an interval or cycle time over which memory utilization is collected, analyzed, and memory settings of different memory regions adjusted to increase efficiency of usage. For example, the user may select a time period of one day, one week, two weeks, or any other duration or length of time. The time period may be defined within a configuration file of the dynamic memory manager. Instead or additionally, the time period may be provided via a user interface or management console of the dynamic memory manager.

In a step 815, the monitoring engine of the dynamic memory manager monitors and collects over the time period memory utilization of a set of memory regions provided by a process virtual machine for execution of the microservice. The monitoring engine fetches utilization of, for example, resident memory, swap memory, heap memory (e.g., survivor, young generation, and old generation), and non-heap (e.g., metaspace, code cache, GC, and thread or stack memory).

A process virtual machine such as JVM may provide a set of tools or utilities to facilitate monitoring. The monitoring engine may interface and communicate with the JVM tools at regular polling or sampling intervals throughout the time period to collect memory utilization and consumption of the memory regions. For example, the sampling interval may be set at every 5, 10, 15, 30, or 60 minutes, or any other interval as desired. The monitoring engine generates a command such as a jstat or jmap command to obtain JVM statistics and details of specific processes in order to gather resource utilization of the microservices. Frequent sampling may increase the pressure on the microservices. Infrequent sampling may not provide a sufficient number of data points to identify memory usage patterns. The sampling interval can be adjusted to balance the need to maintain good performance of the microservices and good collection of memory utilization data. The monitoring engine profiles memory usage of each memory region by each microservice and stores the memory utilization in persistent storage such as in a database.

In a step 820, once the time period has elapsed, a configuration file of the microservice is accessed. The configuration file specifies memory settings of various memory regions (e.g., heap memory) that have been previously configured for the microservice.

In a step 825, memory utilization of each memory region is analyzed to identify, if any, memory regions that have been over-utilized and memory regions that have been under-utilized based on the previously configured memory settings.

In a step 830, for each memory region identified as being over-utilized or under-utilized, a change is made to a memory setting corresponding to an identified memory region in the microservice configuration file. For example, a memory region (e.g., heap) for a microservice may have previously been configured with a first initial value and a first maximum value. The change may include changing the first initial value to a second initial value, different from the first initial value. The second initial value may be greater than the first initial value. The second initial value may be less than the first initial value. The change may include changing the first maximum value to a second maximum value, different from the first maximum value. The second maximum value may be greater than the first maximum value. The second maximum value may be less than the first maximum value.

Changes to the memory settings of the various microservices are logged so that an administrative user can be made aware of the changes and the current memory settings for each of the various microservices.

In an embodiment, analyzing a memory region to determine over-utilization or under-utilization proceeds by calculating an average memory utilization value for the memory region based on the memory utilization data collected over the time period. Memory settings or parameters of a particular memory region may be associated with a soft threshold value and a hard threshold value. Different parameters can have their own soft and hard threshold values.

The soft and hard threshold values may be used to guide the analytic engine with making changes to the memory settings or parameters of a memory region. In an embodiment, the soft and hard threshold values are determined based on performance testing of the microservice by the developer of the microservice. The hard threshold value specifies a maximum value that the analytical engine is allowed to set for a parameter associated with the memory region. The hard threshold value thus defines an upper limit of a range that the analytic engine is able to set for a particular memory region for a particular microservice.

The soft threshold value corresponds to a worst case scenario that the developer does not expect would be exceed, but the analytical engine is permitted to exceed the soft threshold value if needed based on the collected memory utilization data. In an embodiment, the soft threshold value is set to what is expected to be a worst case scenario of memory utilization for a particular memory region by a particular microservice. The hard threshold value is set to a multiplier or percentage increase above the soft threshold value. For example, the hard threshold value may be set to a value that is 1.5 times or 2 times the soft threshold value, or any other multiplier as desired.

In an embodiment, dynamically managing memory of a memory region for a microservice based on the collected utilization data for the time period includes evaluating the calculated value (e.g., average utilization) against threshold values and previously existing settings of the memory region. If, for example, the calculated value is greater than the soft threshold value, greater than the previously existing settings, and less than the hard threshold value, the analytical engine makes changes to the service script (e.g., configuration script or configuration file).

In an embodiment, an initial memory size of a memory region is set to a value equal to a maximum used size plus a first additional percentage of the maximum used size. A maximum memory size of the memory region is set to a value equal to the maximum used size plus a second additional percentage of the maximum used size, greater than the first additional percentage. For example, the first additional percentage may be 10 percent. The second additional percentage may be 30 percent. The additional percentages provide an additional buffer or margin to handle special situations or contingencies or other increases in demand.

As an example, consider that an initial or minimum heap setting is 128 MB, a maximum heap setting is 1024 MB, and a calculated value (e.g., average value over the time period) is 256 MB. For minimum memory, a soft threshold could be 32 MB and a hard threshold value could be 64 MB. For maximum memory, the soft threshold could be 1536 MB and the hard threshold could be 2048 MB. The monitoring engine collects all runtime values during the time period cycle. The analytical engine then selects a needed value to calculate proper settings. For example, for the whole cycle, the minimum size and minimum used size, the minimum size may be calculated as follows: Minimum size=minimum used size*(1+min free ratio)

In an embodiment, the min free ratio by default is 10 percent, but it can be impacted by other data, such as garbage collection times and total garbage collection time. In an embodiment, the monitoring engine tracks a number of garbage collection cycles and durations of the garbage collection cycles. Predetermined thresholds corresponding to a number of garbage collection cycles and durations of garbage collection cycles may be configured. If the analytical engine finds that there are too many garbage collection cycles (e.g., number of GC cycles exceeds a threshold number) and total garbage collection time exceed a threshold duration, then the analytical engine may increase the min free ratio to reduce garbage collection, and so minimum size would also be impacted accordingly. After the new settings are applied, analytical engine would again check the memory utilization data in the next cycle to determine wither further changes may be needed to make efficient use of memory. For example, there may have been changes business load, side effects due to other changes, and the like. If there are no load changes, the analytical engine determines balanced settings for the system to generate good throughput based on limited resources.

Applying regression analysis to analyze memory usage patterns and develop a prediction model in order to derive or predict efficient memory settings is merely an example of a statistical modeling technique that may be used in one or more embodiments. In other embodiments, other statistical modeling techniques may be used instead of or in addition to regression analysis of the collected memory utilization data over the user specified time period. Examples of other statistical modeling techniques to build a prediction model to memory usage and thus configure efficient memory settings include machine learning (ML), artificial intelligence (AI), deep learning, and others.

In an embodiment, predicting efficient memory settings is performed using memory usage data collected over a single time period. The memory settings are adjusted for a next time period and the predicting and adjusting continues to be repeated for each successive time period. In other embodiments, predicting efficient memory settings is performed using memory usage data collected over multiple time periods. Thus, over time and with each passing cycle of the time period, the corpus of memory usage that can be used as training data continues to grow. Having a continually larger body of training data can, in turn, continually increase the accuracy of a prediction model and thereby continually increase memory efficiency.

In a step 835, once a change is made to the configuration file, the dynamic memory manager (or analytical engine) waits for the microservice associated with the configuration file to enter an idle state. To determine an idle state, the analytical engine may poll the system manager or a tool or utility that may be exposed by the JVM (or other process virtual machine). In an embodiment, where the application includes a data protection backup product, the analytical engine may review a backup schedule specifying times for backups (e.g., backup windows). The analytical engine may identify an idle time as being times outside of the backup window times. For example, if a backup window is from 9 PM to 6 AM, the analytical engine may identify a restart time as being outside of the 9 PM to 6 AM window (e.g., 8:00 PM).

In a step 840, upon the microservice entering the idle state, a command is generated to restart the microservice for the changed memory settings of the identified memory regions specified in the configuration file to take effect. In other words, once a more efficient memory setting is identified and a corresponding change made to the configuration file of the microservice, the changed or new settings may not take effect immediately. In order for the changed settings to take effect, the microservice needs to be restarted so that the new configuration file can be read and the memory configured accordingly. Restarting the microservice, however, can disrupt the processing of production requests. The time to restart a microservice may range from about 10 to about 15 seconds. Waiting for an idle state or time helps to reduce any performance impact that the restarting of the microservice might have. While waiting for a microservice to enter an idle state, the microservice will continue to rely on the previous or old memory settings.

Thus, microservices may be restarted at different times as the microservices might not necessarily all be idle at the same time. For example, memory settings of a first configuration file associated with a first microservice may be updated. Memory settings of a second configuration file associated with a second microservice may be updated. The first microservice may be restarted at a first time. The second microservice may be restarted at a second time, different from the first time.

In a step 845, the monitoring and analysis steps are repeated for a next time period.

Referring back now to FIG. 1, in an embodiment, a garbage collector (GC) manager 160 is provided at the host. The garbage collector manager works with the memory manager to dynamically or automatically select a garbage collector or garbage collection algorithm and, when appropriate, adjust memory settings to increase performance of the microservice application.

In an embodiment, garbage collection refers to a process where unused memory is deallocated. In other words, once an object is no longer referenced, memory occupied by the object can be released and reused for other objects. A process virtual machine, such as the Java virtual machine, can run a garbage collector as a background process to find references that are not used. Memory used by such references can then be freed and reused.

As discussed, Java objects reside in an area referred to as the heap. The heap is created when the JVM starts up. When the heap becomes full, garbage is collected. During garbage collection objects that are no longer used are cleared, thus making space for new objects. A memory segment for the heap is divided into two areas or generations. There is the young generation and the old generation. The young generation space is a part of the heap reserved for allocation of new objects. When the young generation space becomes full, garbage is collected by running a minor garbage collection. During the minor garbage collection, all objects that have lived long enough in the young generation (i.e., are still referenced) are promoted or moved to the old generation space, thus freeing up the young generation space for more object allocation. When the old generation space becomes full garbage is collected there in a process referred to as full garbage collection.

There are different types of garbage collection algorithms provided by the JVM including, for example, serial garbage collection, parallel garbage collection (parallel GC), garbage first garbage collection (G1GC), Z Garbage Collector (ZGC), and Shenandoah garbage collection.

There is active enhancement in this area with recent Java versions. Each garbage collection algorithm has advantages and disadvantages. In particular, each collector may provide varying application throughput and application pause metrics. Throughput refers to the speed at which a Java application runs and pause refers to the time taken by the garbage collector to clean the unused memory spaces.

The most commonly used GC algorithm by various Java applications include parallel garbage collection and garbage first garbage collection. Table B below highlights some key differences between the parallel GC and G1GC algorithms.

TABLE B

| Details | Parallel GC | G1GC |
|---|---|---|
| Usage | The parallel collector is throughput collector with multi threads used for parallel GC. Recommended for applications with more memory pressure where pause time is not critical factor. Also recommended for medium size heap | Garbage collector is a server-style garbage collector, targeted for multiprocessor machines with large memories. Targeted to achieve high throughput with less pause time |

TABLE B-continued

| Details | Parallel GC | G1GC |
| --- | --- | --- |
| Benefits | More Young and Old GC activity with throughput goal and can result into more application pause time<br>Tries to minimize the size of heap usage | Young GC can be high but less old generation GC.<br>Heap usage could be more due to less application pause time<br>Better suit for applications that have rate of object allocation is very high and more live data |
| GC settings | XX: UseParallelGC | XX: UseG1GC |
| Some key tunings | XX: ParallelGCThreads<br>XX: MaxGCPauseMillis = NNN<br>XX: GCTimeRatio = X %<br>XX: Min/MaxHeapFreeRatio<br>XX: -ShrinkHeapInSteps | XX: MaxGCPauseMillis = NNN<br>XX: Min/MaxHeapFreeRatio<br>XX: InitiatingHeapOccupancyPercent<br>XX: G1HeapRegionSize<br>XX: G1NewSize/MaxSizePercent |

Further details on the parallel garbage collection and garbage first garbage collection algorithms are available at https://docs.oracle.com/javase/8/docs/technotes/guides/vm/gctuning/parallel.html and https://docs.oracle.com/javase/8/docs/technotes/guides/vm/gctuning/g1_gc.html and are incorporated by reference.

In an embodiment, systems and techniques are provided to determine an appropriate GC algorithm for Java applications that is suited for a specific level of enhancements that have been made. For example, a service may use parallel collector by default when the service is initially launched. However, depending on heap expansion, memory configuration and specific levels of enhancements that may be rolled out for the service over time, an intelligent algorithm may decide that a different or alternative GC algorithm is more appropriate. The intelligent algorithm monitors the memory characteristics. If the intelligent algorithm determines that the default garbage collector is most appropriate, the default collector continues to be used for a next garbage collection cycle; otherwise, the default garbage collector may be changed dynamically to a new or alternative garbage collector for the next garbage collection cycle.

In an embodiment, the analytical engine monitors the garbage collection activity by measuring the GC events and GC time in young and old generations for each microservice. Each service level throughput and pause time is measured over a period of time and in relation to heap utilization.

In an embodiment, the analytical engine analyzes the garbage collection activity based on one or more of the following performance considerations.

The primary measures of garbage collection are throughput and latency. Throughput is the percentage of total time not spent in garbage collection considered over long periods of time. Throughput includes time spent in allocation (but tuning for speed of allocation generally is not needed).

Latency is the responsiveness of an application. Garbage collection pauses affect the responsiveness of applications. Users have different requirements of garbage collection.

For example, some consider the appropriate metric for a web server to be throughput because pauses during garbage collection may be tolerable or simply obscured by network latencies. However, in an interactive graphics program, even short pauses may negatively affect the user experience. Some users are sensitive to other considerations.

Footprint is the working set of a process, measured in pages and cache lines. On systems with limited physical memory or many processes, footprint may dictate scalability. Promptness is the time between when an object becomes dead and when the memory becomes available, an important consideration for distributed systems, including Remote Method Invocation (RMI). A further discussion of garbage collection tuning is available at https://docs.oracle.com/en/java/javase/11/gctuning/hotspot-virtual-machine-garbage-collection-tuning-guide.pdf and is incorporated by reference.

In an embodiment, the analytical engine checks whether a service is throughput oriented or pause time oriented. For example, if a service is spending most of its time in application time and less in GC time with considerable high pause time, then the service may be a good candidate for the parallel GC algorithm. If service is doing better in both throughput and less GC pause time, then service may be a good candidate for G1GC.

In an embodiment, the analytical engine measures the GC events and GC time for young and old generations. If service pause time is increasing more frequently, then the analytical engine changes the service's garbage collector to "G1GC." If service is not able to maintain a good heap free ratio and there is consistent high heap utilization, then the analytical engine changes the GC algorithm to parallel GC.

During this time, the analytical engine continues to monitor the heap utilization after the GC algorithm is changed for a respective service. If a specific GC algorithm does not offer any improvement based on the heap utilization monitoring, the analytical engine changes the GC algorithm back to the original default garbage collection algorithm. For example, if the analytical engine makes a change from parallel GC to G1GC, and if the throughput or latency goal is not achieved, then the analytical engine changes the GC algorithm back to parallel GC for that service. If service still shows high pressure for heap memory, then the analytical engine changes the maximum heap memory dynamically as shown, for example, in FIG. 8 and described in the accompanying discussion. The analytical engine can change the GC algorithm tuning.

Figure 9:
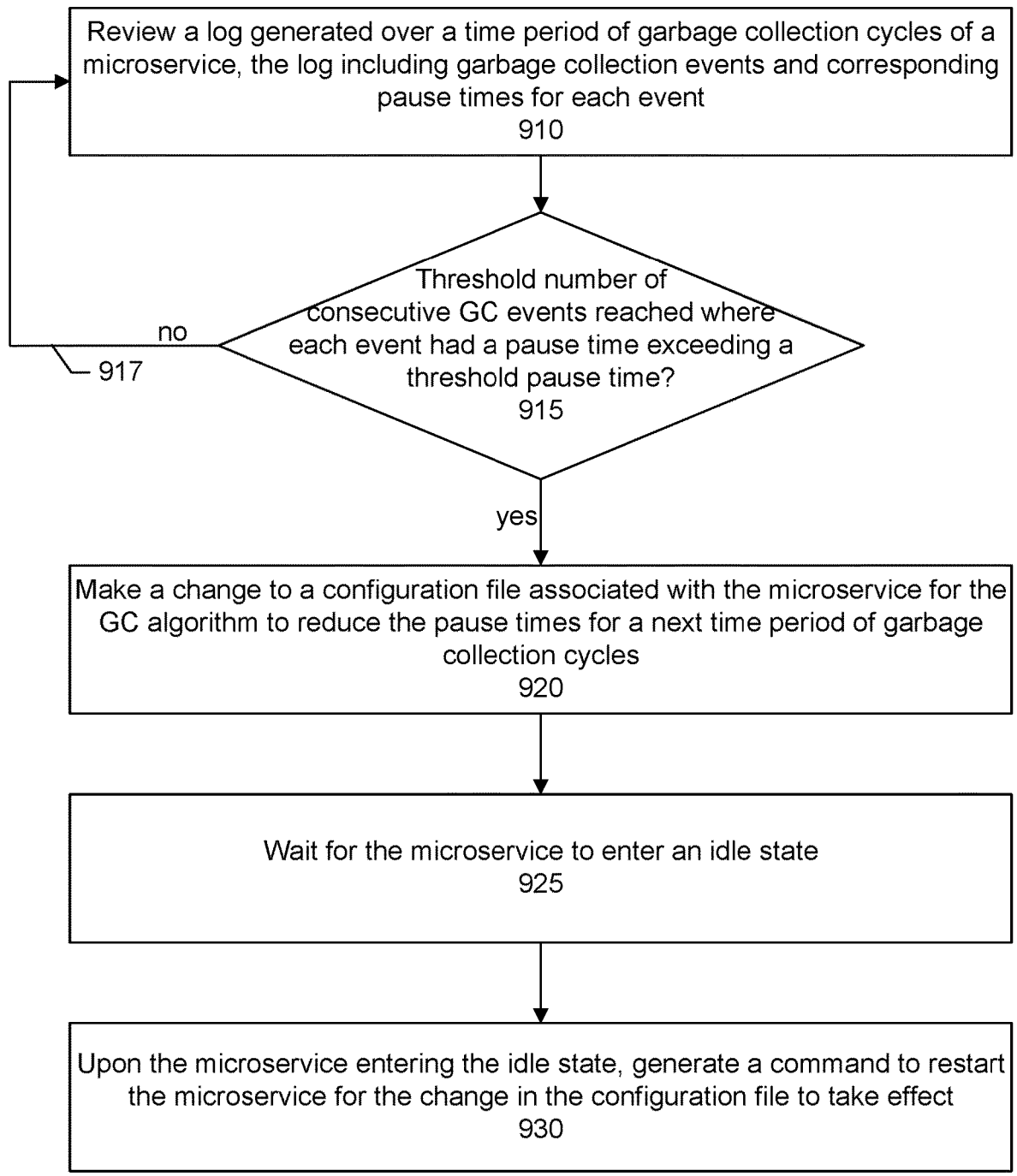
FIG. 9 shows a flow for dynamic selection of garbage collectors for microservices, according to one or more embodiments.

FIG. 9 shows a flow of a process for dynamically selecting a garbage collector for a microservice. In a step 910, a log generated over a time period of garbage collection cycles of a microservice is reviewed. The log includes a chronological recording of garbage collection events and corresponding pause times for each event. As discussed, the time period may be a user-configurable value. For example, the time period may extend for a duration of one week. In an embodiment, the log is a text file generated by the Java virtual machine that records memory cleaning processes of a particular garbage collector for a particular microservice over the course of the time period. The log may include, among other details, allocation failures, young garbage collection, threads being stopped, memory before and after garbage collection, events leading to the promotion of the objects inside the heap memory, and other details on how the garbage collector behaved and resources used. The analytical engine can use the log to observe the garbage collection for a microservice over a period of time to assess the pause times and determine whether changes are needed to help reduce the pause times.

Figure 10:
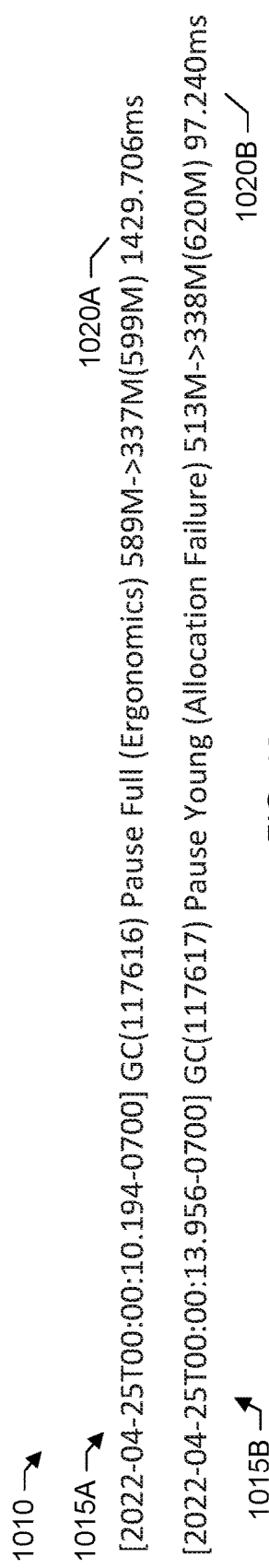
FIG. 10 shows an example of a garbage collection log, according to one or more embodiments.

FIG. 10 shows an example of a garbage collector log 1010. This example shows two garbage collection events or entries 1015A,B. First event 1015A is a full garbage collection cycle (older generation). Second event 1015B is a minor garbage collection cycle (younger generation). As shown in the example of FIG. 10, each garbage collection event is timestamped and includes corresponding pause times 1020A,B. For example, the pause time for the first garbage collection event is 1429.706 milliseconds (ms). The pause time for the second garbage collection event is 97.240 ms.

Referring back now to FIG. 9, based on the review, a determination is made as to whether a threshold number of consecutive garbage collection events has been reached where each consecutive event had a pause time exceeding a threshold pause time. The thresholds are configurable values. For example, the threshold pause time may be set to 5 seconds and the threshold number of consecutive garbage collection events may be set to 3.

If the threshold number of consecutive garbage collection events has not been reached—where each consecutive event had a pause time exceeding the threshold pause time—the process loops back 917 to continue the monitoring of the garbage collection log for a next time period.

If, however, the threshold number of consecutive garbage collection events has been reached where each consecutive event had a pause time exceeding the threshold pause time, an adjustment or tuning phase is triggered that includes making a change to a configuration file associated with the microservice for the GC algorithm to reduce the pause times for a next time period (step 920). The configuration file includes, in addition to memory settings, settings that control which garbage collector JVM should use. That is, each JVM service may be associated with a particular garbage collection algorithm that may be passed as a configuration parameter.

In an embodiment, the microservice is configured with parallel garbage collection being the default garbage collection algorithm. The change may include changing from the default garbage collector to an alternative garbage collector such as the garbage first garbage collection algorithm (G1GC), changing from the alternative garbage collector back to the default garbage collector, or changing a maximum heap memory setting for the microservice.

Figure 11:
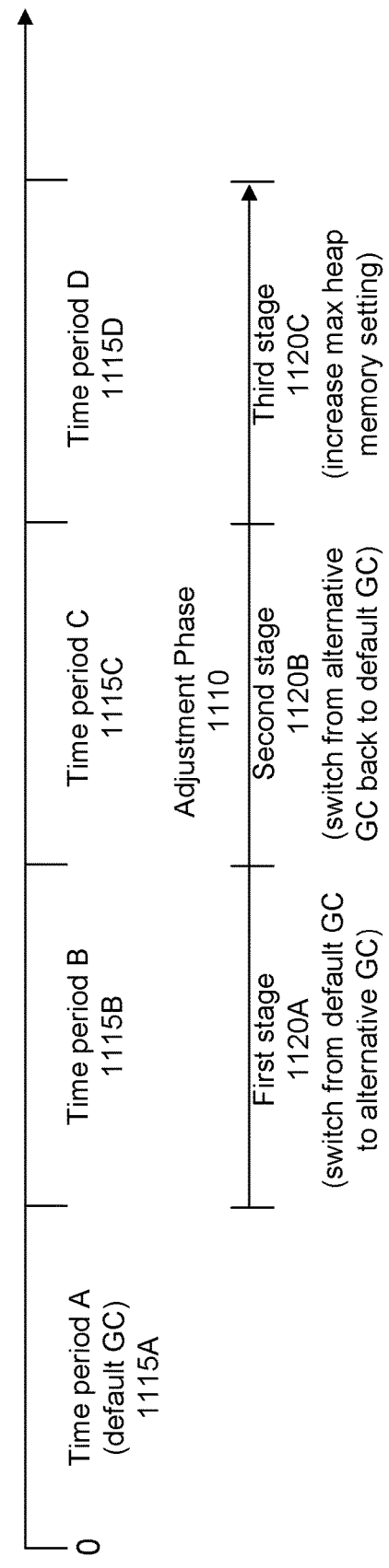
FIG. 11 shows a timeline for tuning garbage collection, according to one or more embodiments.

FIG. 11 shows a timeline illustrating the triggering of an adjustment or tuning phase 1110. During an initial or first time period 1115A, garbage collection for the microservice is handled by a default garbage collector. At an end of the initial time period, a garbage collection log maintained by the default garbage collector is reviewed. If the review of the garbage collection log indicates that the threshold number of consecutive garbage collection events—where each event had a pause time exceeding the threshold pause time—has not been reached, the default garbage collector continues to be used for the next time period.

Alternatively, if the review of the garbage collection log indicates that the threshold number of consecutive garbage collection events has been reached, an adjustment phase is triggered in which a change is made to try and reduce the pause times and thus improve application performance.

As shown in the example of FIG. 11, the adjustment phase includes first, second, and third stages 1120A-C. The type of change that is made for the next time period depends on a current stage of the adjustment phase. In an embodiment, the first stage includes switching from the default garbage collector used in the initial time period to an alternative garbage collector.

If there has not been any improvement in reduction of the pause times using the alternative garbage collector during the first stage, the adjustment phase enters the second stage. Thus, the second stage is after the first stage. The second stage includes switching from the alternative garbage collector back to the default garbage collector.

If there has not been any improvement in reduction of the pause times from having switched back to the default garbage collector, the adjustment phase enters the third stage. Thus, the third stage is after the first and second stages. The third stage includes increasing a maximum heap memory setting.

More particularly, a garbage collector for a time period 1115B, corresponding to the first stage, will be the alternative garbage collector.

At an end of time period 1115B, a garbage collection log maintained by the alternative garbage collector is reviewed. If the review of the garbage collection log indicates that the threshold number of consecutive garbage collection events—where each event had a pause time exceeding the threshold pause time—has not been reached, the alternative garbage collector continues to be used for the next time period (e.g., time period 1115C).

Alternatively, if the review of the garbage collection log indicates that the threshold number of consecutive garbage collection events (where each event had a pause time exceeding the threshold pause time) has again been reached, the garbage collector is switched from the alternative garbage collector back to the default garbage collector for the next time period (e.g., time period 1115C).

At an end of time period 1115C, a garbage collection log maintained by the default garbage collector is again reviewed. If the review of the garbage collection log indicates that the threshold number of consecutive garbage collection events has not been reached, the default garbage collector continues to be used for the next time period (e.g., time period 1115D).

Alternatively, if the review of the garbage collection log indicates that the threshold number of consecutive garbage collection events has again been reached, a maximum heap memory setting for the microservice is increased. The maximum heap memory setting is increased by an additional percentage over the current maximum heap value. For example, the additional percentage may be 10, 20, or 30 percent more than the current maximum heap value. Thus, garbage collection during the next time period (e.g., time period D) will be conducted using the default garbage collector, but there will have been an increase in the maximum heap memory setting. In other words, the failure of both the default garbage collector and alternative garbage collector to achieve acceptable pause times may indicate that memory has been set too low for the application.

Figure 12:
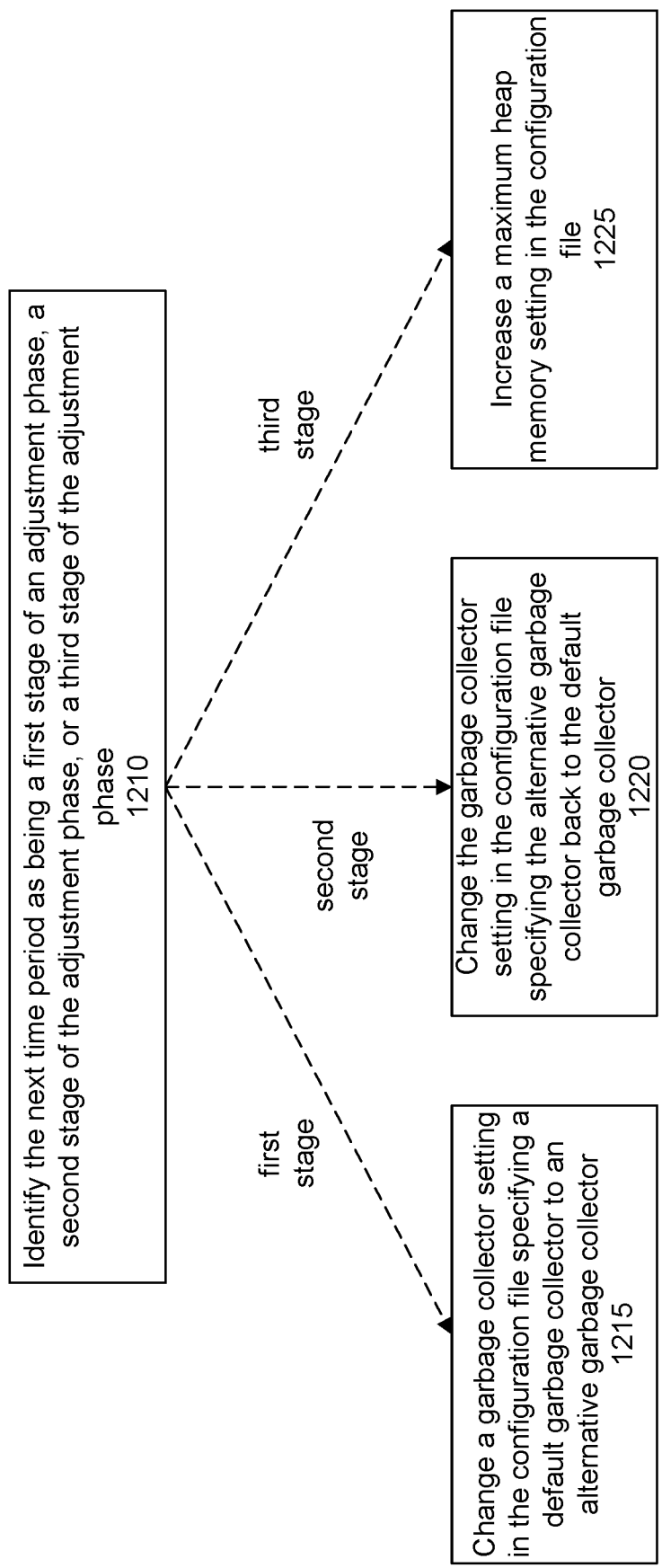
FIG. 12 shows a flow for identifying a tuning stage of garbage collection, according to one or more embodiments.

FIG. 12 shows a flow for determining the type of change to make to the configuration file of the microservice when a review of the log indicates that the threshold number of consecutive garbage collection events (where each event had a pause time exceeding the threshold pause time) has been reached. In a step 1210, an identification is made as to the next time period being a first, second, or third stage of an adjustment phase.

When the next time period corresponds to the first stage of the adjustment phase, a garbage collector setting in the configuration file specifying a default garbage collector is changed to an alternative garbage collector (step 1215). For example, the configuration file may specify parallel garbage collection as the default collection algorithm. In this case, parallel garbage collection may be changed to garbage first garbage collection as the alternative garbage collector.

When the next time period corresponds to the second stage of the adjustment phase, the garbage collector setting in the configuration file specifying the alternative garbage collector is changed back to the default garbage collector (step 1220). For example, the alternative garbage first garbage collector may be switched back to the default parallel garbage collector.

When the next time period corresponds to the third stage of the adjustment phase, a maximum heap memory setting in the configuration file is increased (step 1225). For example, the maximum heap memory setting may be increased by 10, 20, or 30 percent over the current value.

Having a threshold for frequency and another threshold for pause time duration helps to account for one-off events or outliers that may not be reflective of the overall performance of the microservice application. For example, an isolated incident of a pause time exceeding a threshold pause time may not necessarily be a concern. Indeed, even multiple incidents of pause times exceeding the threshold pause time, but scattered over the time period may also not necessarily be a concern. However, a series of consecutive events (e.g., events occurring immediately after each other) may be a concern to warrant a change.

As an example, consider that the threshold pause time has been configured as 5 seconds and the threshold number of consecutive events has been configured as 3. Table C below shows some entries from a garbage collection log generated over a period of time.

TABLE C

| Event | Timestamp | Pause Time (seconds) |
|---|---|---|
| 1 | 2022 Apr. 28 5:00 AM | 6 |
| 2 | 2022 Apr. 28 6:30 AM | 6 |
| 3 | 2022 Apr. 28 7:00 AM | 3 |
| 4 | 2022 Apr. 28 8:40 AM | 6 |
| 5 | 2022 Apr. 28 10:00 AM | 2 |

In the example shown in table C above, there are three garbage collection events for which the threshold pause time of 5 seconds was exceeded. In particular, the pause times for garbage collection events 1, 2, and 4 exceeded the threshold pause time of 5 seconds. These events, however, were not consecutive. Thus, no changes to the configuration file of the microservice would be made.

Table D below shows another example of entries from a garbage collection log generated over a period of time.

TABLE D

| Event | Timestamp | Pause Time (seconds) |
|---|---|---|
| 1 | 2022 Apr. 28 5:00 AM | 6 |
| 2 | 2022 Apr. 28 6:30 AM | 6 |
| 3 | 2022 Apr. 28 7:00 AM | 6 |
| 4 | 2022 Apr. 28 8:40 AM | 1 |
| 5 | 2022 Apr. 28 10:00 AM | 2 |

In the example shown in table D above, there are three garbage collection events for which the threshold pause time of 5 seconds was exceeded. In particular, the pause times for garbage collection events 1, 2, and 3 exceeded the threshold pause time of 5 seconds. These events were consecutive. That is, garbage collection event 1 exceeded the threshold pause time and each of the following garbage collection events 2 and 3 also exceeded the threshold pause time of 5 seconds and were immediately after each other. Garbage collection event 2 occurred immediately after garbage collection event 1. Garbage collection event 3 occurred immediately after garbage collection event 2. Thus, in this example, a change to the configuration file of the microservice would be made to try and reduce the pause times for a next time period. In an embodiment, each change of a garbage collector or memory setting for a service is accompanied by a notification alert to inform the user of the change.

Referring back now to FIG. 9, in a step 925, the process waits for the microservice to enter an idle state. In a step 930, upon the microservice entering the idle state, a command is generated to restart the microservice for the change in the configuration file to take effect. As discussed, waiting for the microservice to enter the idle state helps to reduce overall disruption to production processes and requests that may be relying on the microservice.

An application composed of many different microservices may be configured with the same default garbage collector for each service. As the application continue to run, however, the type of garbage collectors used may vary across each of the different services. For example, a first microservice of an application may use a first type of garbage collector. A second microservice of the application may use a second type of garbage collector, different from the first type of garbage collector.

In an embodiment, there is a method comprising: reviewing a log generated over a time period of garbage collection cycles of a microservice, the log comprising garbage collection events and corresponding pause times for each event; determining that a threshold number of consecutive garbage collection events has been reached where each consecutive event had a pause time exceeding a threshold pause time; upon the determination, making a change to a configuration file associated with the microservice to reduce the pause times for a next time period; waiting for the microservice to enter an idle state; and upon the microservice entering the idle state, generating a command to restart the microservice for the change in the configuration file to take effect.

The change to the configuration file may include changing a garbage collector setting in the configuration file specifying a default garbage collector to an alternative garbage collector. The change to the configuration file may include adjusting a maximum heap memory setting in the configuration file from a first value to a second value, greater than the first value. The change to the configuration file may include adjusting a maximum heap memory setting in the configuration file to an additional percentage over a current value of the maximum heap memory setting. The change to the configuration file may include changing from a parallel garbage collector to a garbage first garbage collector.

In an embodiment, the change to the configuration file includes: identifying the next time period as being a time period after first and second previous time periods, wherein the first previous time period is associated with having switched from a default garbage collector to an alternative garbage collector, and the second previous time period is associated with having switched from the alternative garbage collector back to the default garbage collector; and based on the identification, adjusting a maximum heap memory setting in the configuration file from a first value to a second value, greater than the first value.

In another embodiment, there is a system comprising: a processor; and memory configured to store one or more sequences of instructions which, when executed by the processor, cause the processor to carry out the steps of: reviewing a log generated over a time period of garbage collection cycles of a microservice, the log comprising garbage collection events and corresponding pause times for each event; determining that a threshold number of consecutive garbage collection events has been reached where each consecutive event had a pause time exceeding a threshold pause time; upon the determination, making a change to a configuration file associated with the microservice to reduce the pause times for a next time period; waiting for the microservice to enter an idle state; and upon the microservice entering the idle state, generating a command to restart the microservice for the change in the configuration file to take effect.

In another embodiment, there is a computer program product, comprising a non-transitory computer-readable medium having a computer-readable program code embodied therein, the computer-readable program code adapted to be executed by one or more processors to implement a method comprising: reviewing a log generated over a time period of garbage collection cycles of a microservice, the log comprising garbage collection events and corresponding pause times for each event; determining that a threshold number of consecutive garbage collection events has been reached where each consecutive event had a pause time exceeding a threshold pause time; upon the determination, making a change to a configuration file associated with the microservice to reduce the pause times for a next time period; waiting for the microservice to enter an idle state; and upon the microservice entering the idle state, generating a command to restart the microservice for the change in the configuration file to take effect.

In an embodiment, there is a method comprising: receiving, from a user, a time period over which memory settings of a microservice are to be dynamically managed, the memory settings for the microservice being stored in a configuration file; monitoring, during the time period, memory utilization of a plurality of memory regions provided by a process virtual machine for execution of the microservice; analyzing the memory utilization of each of the plurality of memory regions to identify memory regions that have been over-utilized and memory regions that have been under-utilized; for each memory region identified as being over-utilized or under-utilized, changing, in the configuration file, a memory setting corresponding to an identified memory region; after the changing, waiting for the microservice to enter an idle state; and once the microservice has entered the idle state, generating a command to restart the microservice for changed memory settings of the identified memory regions to take effect.

The method may further include after the changing the configuration file, generating an alert notification to the user indicating that a change to a memory setting of a memory region has been made.

In an embodiment, the method further includes: calculating, for each memory region, a maximum amount of memory used by the microservice during the time period; comparing, for each memory region, the maximum amount of memory used to an amount of memory configured in the configuration file for a respective memory region; and if the maximum amount of memory used exceeds a threshold value associated with the respective memory region, increasing the amount of memory configured for the respective memory region to a value equal to the maximum amount of memory used plus an additional percentage margin of the maximum amount of memory used.

In an embodiment, the method further includes: calculating, for each memory region, a maximum amount of memory used by the microservice during the time period; comparing, for each memory region, the maximum amount of memory used to an amount of memory configured in the configuration file for a respective memory region; and if the maximum amount of memory used is below a threshold value associated with the respective memory region, decreasing the amount of memory configured for the respective memory region to a value equal to the maximum amount of memory used plus an additional percentage margin of the maximum amount of memory used.

In an embodiment, the configuration file is a first configuration file, the microservice is a first microservice, and the method further comprises: changing a memory setting in a second configuration file associated with a second microservice; waiting for the second microservice to enter the idle state; and once the second microservice has entered the idle state, generating a command to restart the second microservice for changed memory settings in the second configuration file to take effect.

The method may include applying regression analysis to the memory utilization to generate a prediction model of memory usage by the microservice; and changing a memory size of a memory region for the microservice based on the prediction model.

The method may include repeating dynamic management of the memory settings of the microservice for a next time period.

Figure 13:
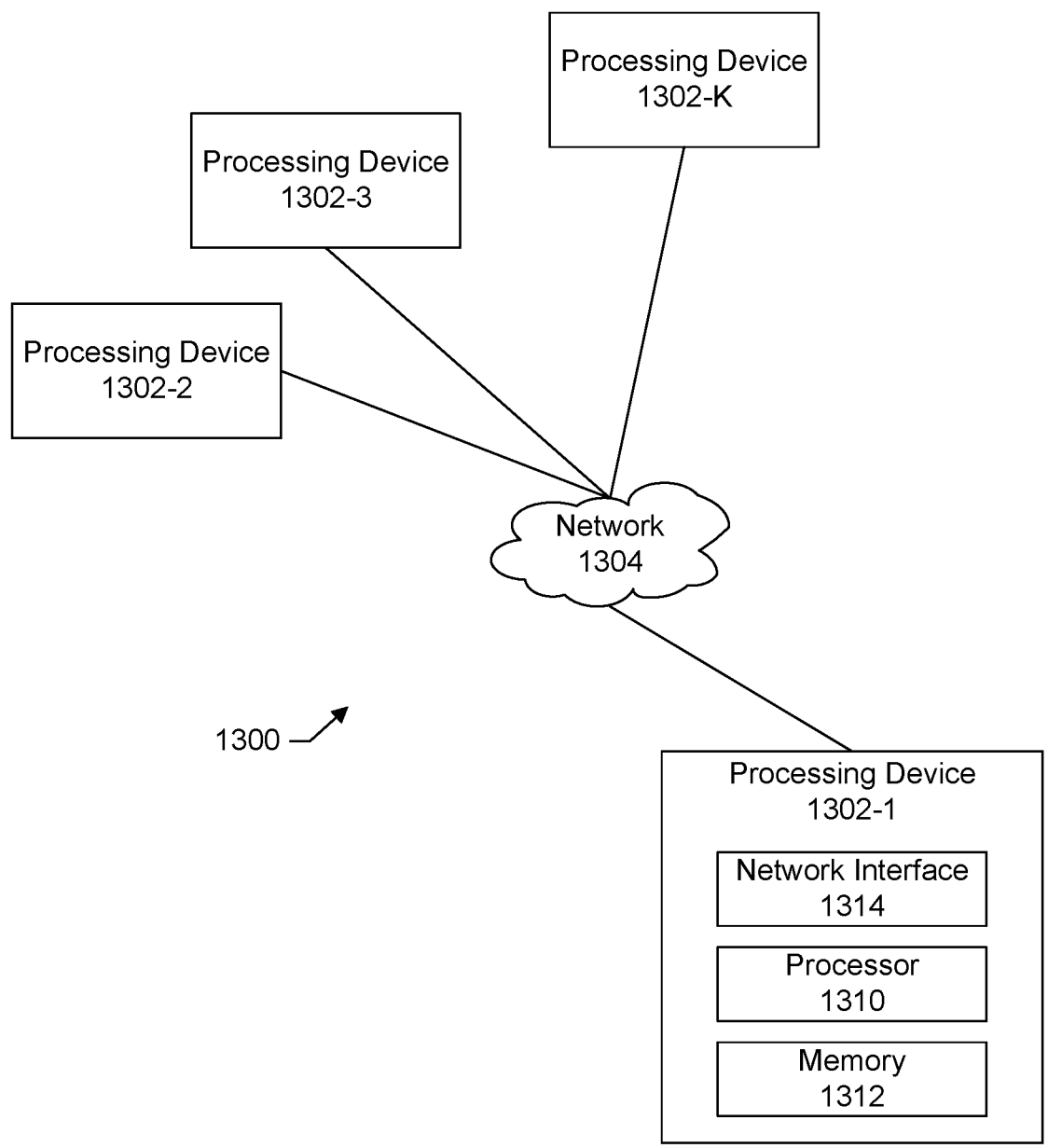
FIG. 13 shows a block diagram of a processing platform that may be utilized to implement at least a portion of an information processing system, according to one or more embodiments.
Figure 14:
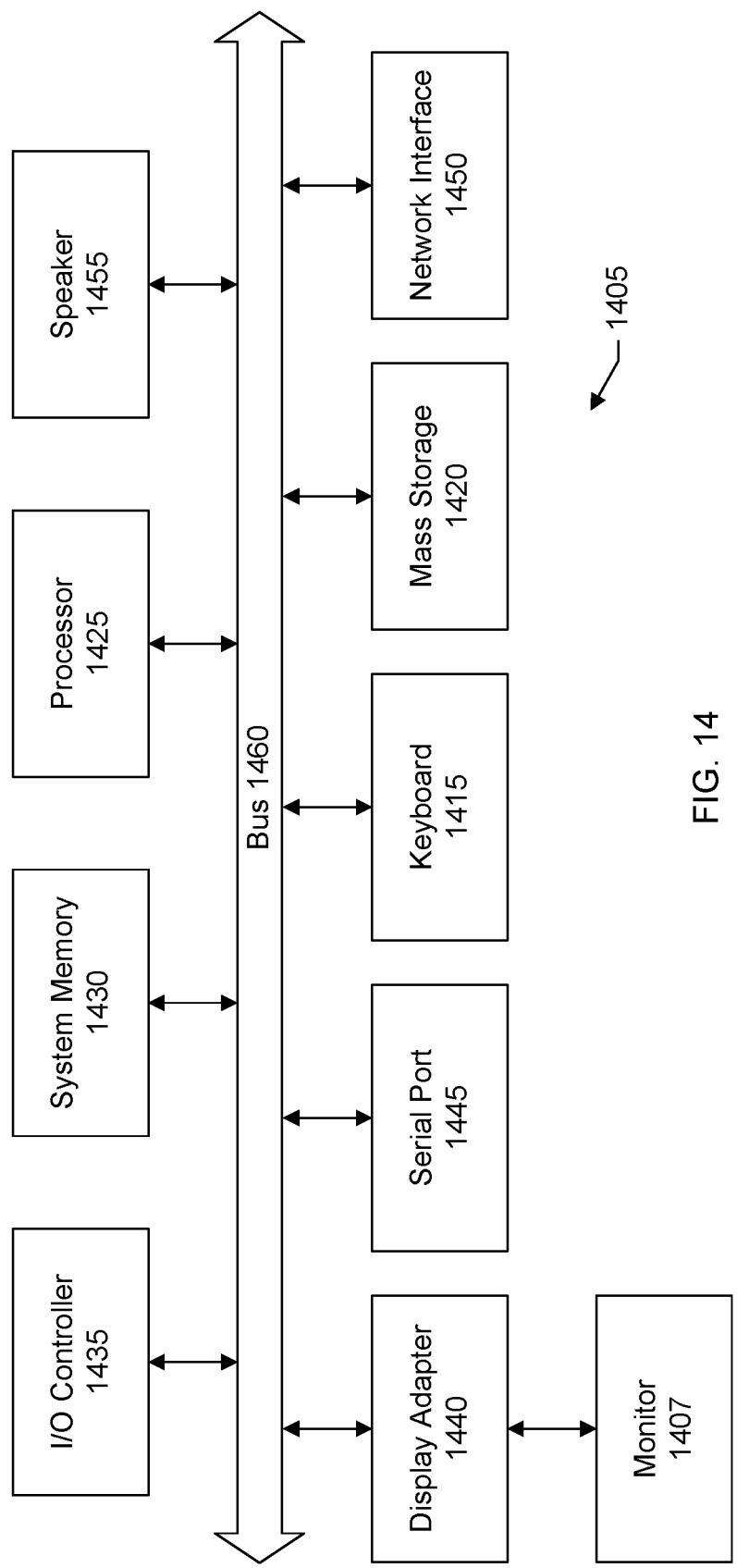
FIG. 14 shows a block diagram of a computer system suitable for use with the system, according to one or more embodiments.

FIG. 13 shows an example of a processing platform 1300 that may include at least a portion of the information handling system shown in FIG. 1. The example shown in FIG. 13 includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312.

The processor 1310 may comprise a microprocessor, a microcontroller, an application-specific integrated circuit (ASIC), a field-programmable gate array (FPGA) or other type of processing circuitry, as well as portions or combinations of such circuitry elements.

The memory 1312 may comprise random access memory (RAM), read-only memory (ROM) or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

FIG. 10 shows a system block diagram of a computer system 1005 used to execute the software of the present system described herein. The computer system includes a monitor 1007, keyboard 1015, and mass storage devices 1020. Computer system 1005 further includes subsystems such as central processor 1025, system memory 1030, input/output (I/O) controller 1035, display adapter 1040, serial or universal serial bus (USB) port 1045, network interface 1050, and speaker 1055. The system may also be used with computer systems with additional or fewer subsystems. For example, a computer system could include more than one processor 1025 (i.e., a multiprocessor system) or a system may include a cache memory.

Arrows such as 1060 represent the system bus architecture of computer system 1005. However, these arrows are illustrative of any interconnection scheme serving to link the subsystems. For example, speaker 1055 could be connected to the other subsystems through a port or have an internal direct connection to central processor 1025. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, interne, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:
1. A method comprising:
reviewing a log generated over a time period of garbage collection cycles of a microservice, the log comprising garbage collection events and corresponding pause times for each event;

determining that a threshold number of consecutive garbage collection events has been reached where each consecutive event had a pause time exceeding a threshold pause time;

upon the determination, making a change to a configuration file associated with the microservice to reduce the pause times for a next time period;

waiting for the microservice to enter an idle state; and upon the microservice entering the idle state, generating a command to restart the microservice for the change in the configuration file to take effect.

2. The method of claim 1 wherein the change to the configuration file comprises changing a garbage collector setting in the configuration file specifying a default garbage collector to an alternative garbage collector.

3. The method of claim 1 wherein the change to the configuration file comprises adjusting a maximum heap memory setting in the configuration file from a first value to a second value, greater than the first value.

4. The method of claim 1 wherein the change to the configuration file comprises adjusting a maximum heap memory setting in the configuration file to an additional percentage over a current value of the maximum heap memory setting.

5. The method of claim 1 wherein the change to the configuration file comprises:

identifying the next time period as being a time period after first and second previous time periods, wherein the first previous time period is associated with having switched from a default garbage collector to an alternative garbage collector, and the second previous time period is associated with having switched from the alternative garbage collector back to the default garbage collector; and based on the identification, adjusting a maximum heap memory setting in the configuration file from a first value to a second value, greater than the first value.

6. The method of claim 1 wherein the change to the configuration file comprises changing from a parallel garbage collector to a garbage first garbage collector.

7. A system comprising: a processor; and memory configured to store one or more sequences of instructions which, when executed by the processor, cause the processor to carry out the steps of:

reviewing a log generated over a time period of garbage collection cycles of a microservice, the log comprising garbage collection events and corresponding pause times for each event;

determining that a threshold number of consecutive garbage collection events has been reached where each consecutive event had a pause time exceeding a threshold pause time;

upon the determination, making a change to a configuration file associated with the microservice to reduce the pause times for a next time period;

waiting for the microservice to enter an idle state; and upon the microservice entering the idle state, generating a command to restart the microservice for the change in the configuration file to take effect.

8. The system of claim 7 wherein the change to the configuration file comprises changing a garbage collector setting in the configuration file specifying a default garbage collector to an alternative garbage collector.

9. The system of claim 7 wherein the change to the configuration file comprises adjusting a maximum heap memory setting in the configuration file from a first value to a second value, greater than the first value.

10. The system of claim 7 wherein the change to the configuration file comprises adjusting a maximum heap memory setting in the configuration file to an additional percentage over a current value of the maximum heap memory setting.

11. The system of claim 7 wherein the change to the configuration file comprises:

identifying the next time period as being a time period after first and second previous time periods, wherein the first previous time period is associated with having switched from a default garbage collector to an alternative garbage collector, and the second previous time period is associated with having switched from the alternative garbage collector back to the default garbage collector; and based on the identification, adjusting a maximum heap memory setting in the configuration file from a first value to a second value, greater than the first value.

12. The system of claim 7 wherein the change to the configuration file comprises changing from a parallel garbage collector to a garbage first garbage collector.

13. A computer program product, comprising a non-transitory computer-readable medium having a computer-readable program code embodied therein, the computer-readable program code adapted to be executed by one or more processors to implement a method comprising:

reviewing a log generated over a time period of garbage collection cycles of a microservice, the log comprising garbage collection events and corresponding pause times for each event;

determining that a threshold number of consecutive garbage collection events has been reached where each consecutive event had a pause time exceeding a threshold pause time;

upon the determination, making a change to a configuration file associated with the microservice to reduce the pause times for a next time period;

waiting for the microservice to enter an idle state; and upon the microservice entering the idle state, generating a command to restart the microservice for the change in the configuration file to take effect.

14. The computer program product of claim 13 wherein the change to the configuration file comprises changing a garbage collector setting in the configuration file specifying a default garbage collector to an alternative garbage collector.

15. The computer program product of claim 13 wherein the change to the configuration file comprises adjusting a maximum heap memory setting in the configuration file from a first value to a second value, greater than the first value.

16. The computer program product of claim 13 wherein the change to the configuration file comprises adjusting a maximum heap memory setting in the configuration file to an additional percentage over a current value of the maximum heap memory setting.

17. The computer program product of claim 13 wherein the change to the configuration file comprises:

identifying the next time period as being a time period after first and second previous time periods, wherein the first previous time period is associated with having switched from a default garbage collector to an alternative garbage collector, and the second previous time period is associated with having switched from the alternative garbage collector back to the default garbage collector; and based on the identification, adjusting a maximum heap memory setting in the configuration file from a first value to a second value, greater than the first value.

18. The computer program product of claim 13 wherein the change to the configuration file comprises changing from a parallel garbage collector to a garbage first garbage collector.

* * * * *